US007784440B2

(12) United States Patent
Yuasa

(10) Patent No.: US 7,784,440 B2
(45) Date of Patent: Aug. 31, 2010

(54) COMBUSTION ENGINE WITH A PRIMING PUMP

(75) Inventor: Tsuneyoshi Yuasa, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 11/872,595

(22) Filed: Oct. 15, 2007

(65) Prior Publication Data

US 2008/0092840 A1 Apr. 24, 2008

(30) Foreign Application Priority Data

Oct. 19, 2006 (JP) ............................. 2006-285171

(51) Int. Cl.
*B23D 57/02* (2006.01)
*F02M 1/16* (2006.01)

(52) U.S. Cl. ............................ 123/179.11; 123/179.12; 123/179.15; 30/381; 165/301

(58) Field of Classification Search ................... 30/381; 123/198 E, 179.11–179.15, 494, 575, 576, 123/579, 581; 173/162.1; 83/811, 820; 165/301; 261/DIG. 8; *F02M 1/16; B23D 57/02*
See application file for complete search history.

(56) References Cited

U.S. PATENT DOCUMENTS 3,372,718 A * 3/1968 Irgens ......................... 30/381
4,203,405 A * 5/1980 Schultz et al. ......... 123/179.11
4,370,809 A * 2/1983 Takahashi et al. ............. 30/381
5,738,064 A * 4/1998 Lowe et al. .............. 123/198 E

FOREIGN PATENT DOCUMENTS

JP 10-311227 11/1998

* cited by examiner

*Primary Examiner*—Stephen K Cronin
*Assistant Examiner*—Keith Coleman

(57) ABSTRACT

A combustion engine includes a carburetor, which is a fuel supply device for introducing fuel into an intake air of the engine, and a fan housing for enclosing a cooling fan mounted on a front end portion of a crankshaft. The fan housing is formed with a flange so as to extend towards a position proximate to the carburetor, and a manually operable priming pump is fitted to the flange.

10 Claims, 5 Drawing Sheets

COMBUSTION ENGINE WITH A PRIMING PUMP

BACKGROUND OF THE INVENTION

1. Field of the Invention

The present invention relates to a compact size combustion engine for use in a brush cutter or a hedge trimmer.

2. Description of the Prior Art

In this kind of combustion engine, a priming pump 42 is generally secured to a lower portion of a carburetor 41 that protrudes laterally outwardly of an engine body 1 as shown in FIG. 4. The carburetor 41 used therein is of, for example, a diaphragm type that is operable in such a manner that when the priming pump 42 is driven, a quantity of fuel can be drawn into a metering chamber (not shown) defined in the carburetor 41. In such case, the priming pump 42 is positioned in a deep inner region beneath the carburetor 41 as clearly shown in FIG. 5, and accordingly, the presence of fuel tubes 43 and 44 nearby interfere often the manipulability of the carburetor 41.

Also, the Japanese Laid-open Patent Publication No. H10-311227, published Nov. 24, 1998, discloses the priming pump mounted on a projection formed in an insulator structure interposed between the carburetor and the engine body. It has, however, been found that the provision of the insulator structure results in a considerable increase of the size. In addition, the engine system in which the priming pump is secured to an air cleaner housing is also known in the art. However, since the air cleaner housing is generally low in strength, difficulty has been often experienced in applying a relatively high pressing force to the priming pump for manipulation.

SUMMARY OF THE INVENTION

In view of the foregoing, the present invention is intended to provide a combustion engine easy to manipulate and having a high support strength, with which the priming pump can be supported.

In order to accomplish the foregoing object, the present invention in accordance with one aspect thereof provides a combustion engine including a crankshaft, a fuel supply device for introducing fuel into an intake air of the engine, a cooling fan mounted on a front end portion of the crankshaft, and a fan housing for enclosing the cooling fan. The fan housing has a flange formed therein so as to extend towards a position proximate to the fuel supply device, and a manually operable priming pump fitted to the flange.

According to the present invention, the priming pump is fitted to the flange rigid or integral with the fan housing and, therefore, the priming pump can be allowed to have a substantial distance from the lower region of the carburetor, resulting in an easiness to manipulate the priming pump.

Also, since the priming pump is rigidly connected with the fan housing, the support strength is high and the load imposed as a result of the pressing operation applied to the priming pump can be sufficiently accommodated. In addition, since the flange extends to a location proximate to the carburetor, the fuel supply tube fluidly connecting between the priming pump, secured to the flange, and the carburetor may have a reduced length.

In a preferred embodiment of the present invention, a guard for covering an outer periphery of the priming pump is fitted to the flange. This is particularly advantageous in that since the priming pump is covered by the guard, an undesirable contact with peripheral parts such as, for example, the grips for the recoil starter can be avoided.

In a further preferred embodiment of the present invention, the guard enclosing the outer periphery of the priming pump is of a cylindrical configuration with the priming pump encompassed within it. Preferably, the operating portion of the priming pump has a tip area positioned axially inwardly of the guard from an open end edge of the guard. The fan housing, the flange and the guard, all referred to above, may be formed integrally with each other in a unitary structure. This is particularly advantageous in that the guard can have a compact form and can also provide an attractive appearance.

In another preferred embodiment of the present invention, the priming pump is arranged at a location downwardly and forwardly of the fuel supply device and laterally of the fan housing. According to this feature, a further easiness to manipulate the priming pump can be accomplished.

In a still further preferred embodiment of the present invention, an operating portion of the priming pump may be oriented forwards so that the operating portion can be manipulated from the front. According to this feature, since the priming pump is oriented forwards, the priming pump can easily be manipulated.

The present invention in accordance with another aspect thereof provides a combustion engine including a crankshaft, a crankcase for rotatably supporting the crankshaft, a cylinder block mounted atop the crankcase, a fuel supply device fluidly connected with one lateral portion of the cylinder block for introducing fuel into an intake air of the engine, a cooling fan mounted on a front end portion of the crankshaft for rotation together therewith, and a fan housing for enclosing the cooling fan. The fan housing has a flange formed therein so as to extend towards a position proximate to the fuel supply device, and a manually operable priming pump fitted to the flange. The priming pump is arranged at a location downwardly and forwardly of the fuel supply device and laterally of the fan housing.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, a preferred embodiment of the present invention will be described in detail with particular reference to FIGS. 1 to 3.

Figure 1:
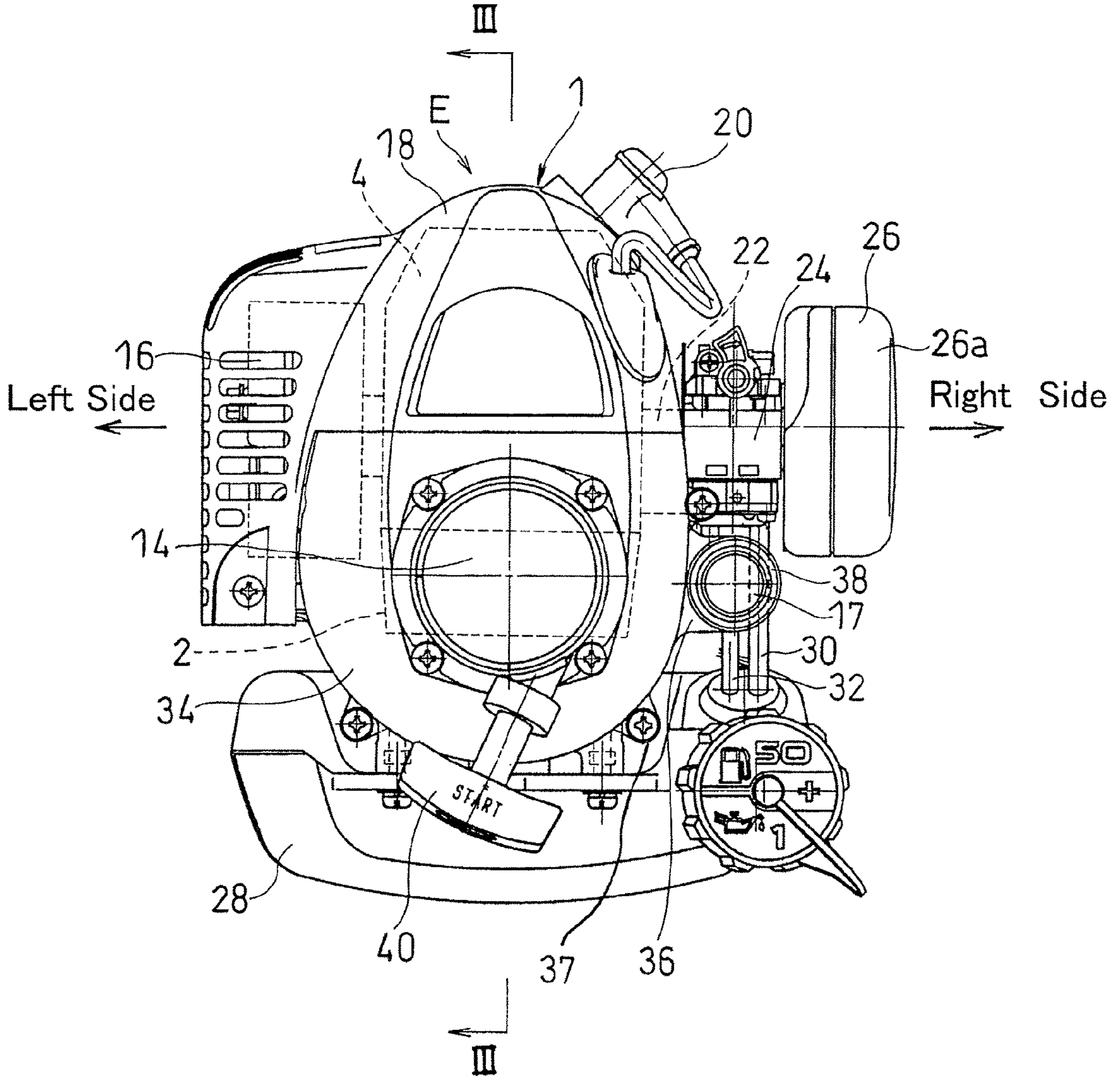
FIG. 1 is a front elevational view of a combustion engine according to a preferred embodiment of the present invention.
Figure 2:
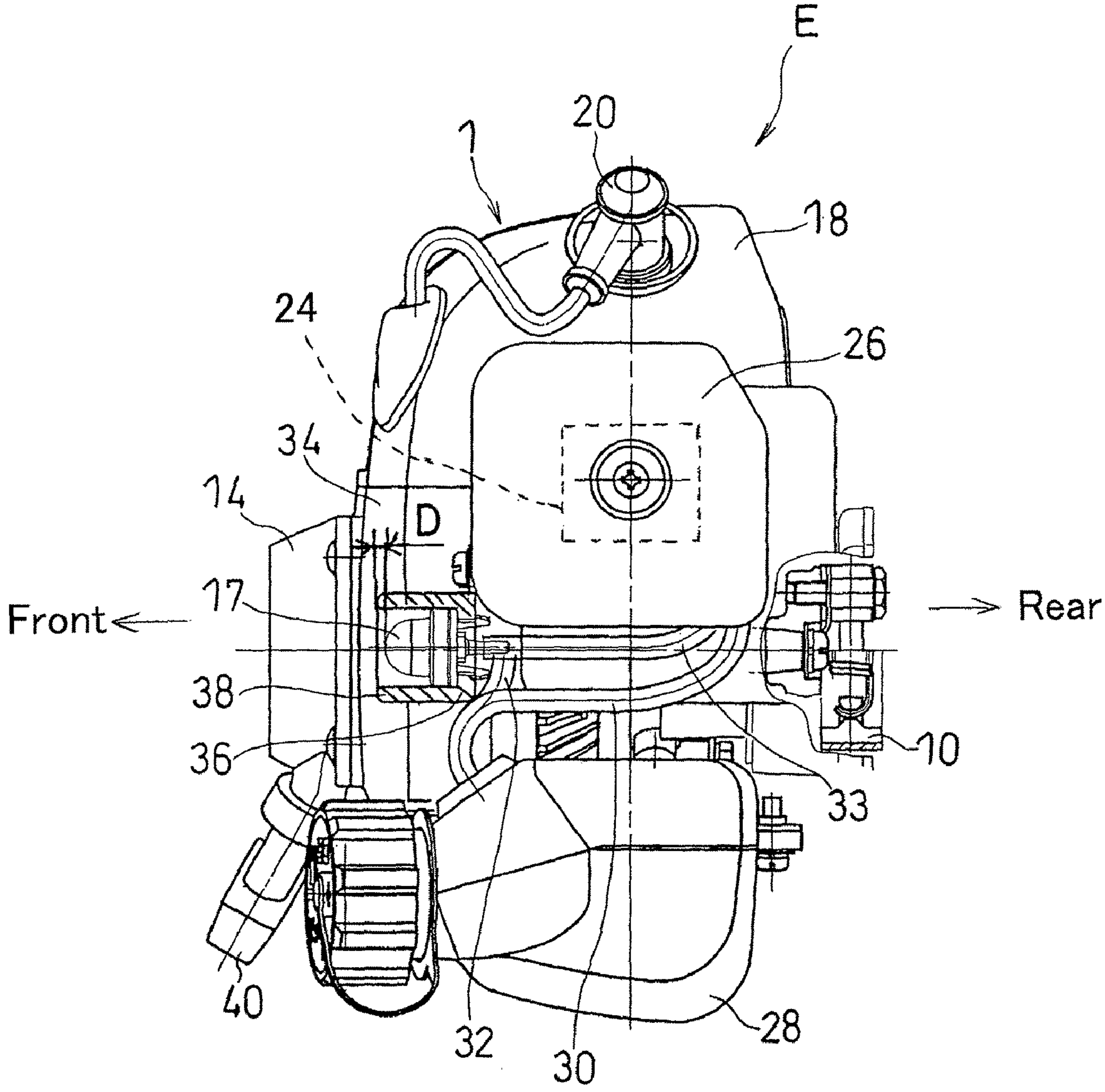
FIG. 2 is a side view of the combustion engine.
Figure 3:
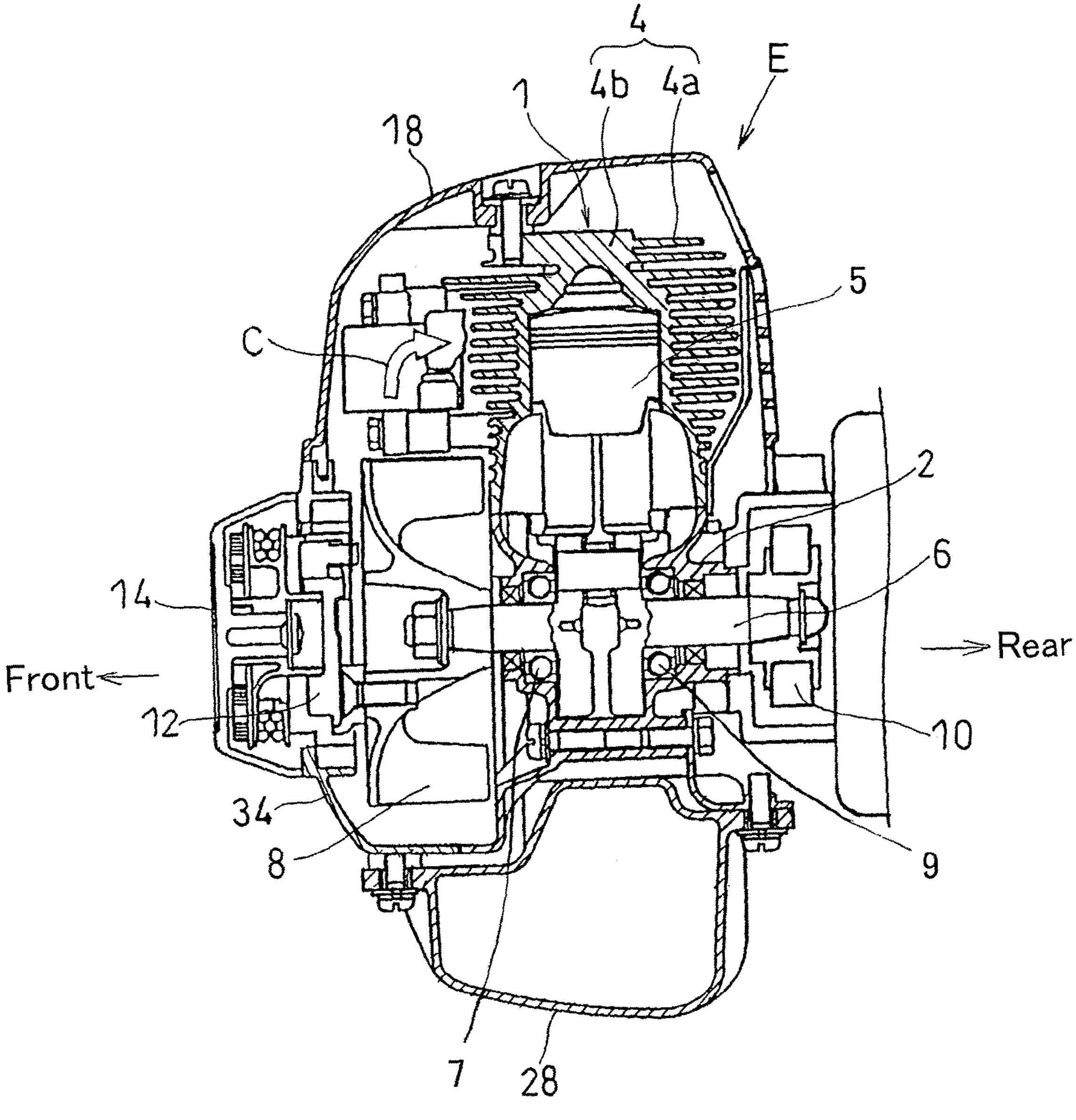
FIG. 3 is a cross-sectional view taken along the line III-III in FIG. 1.
Figure 4:
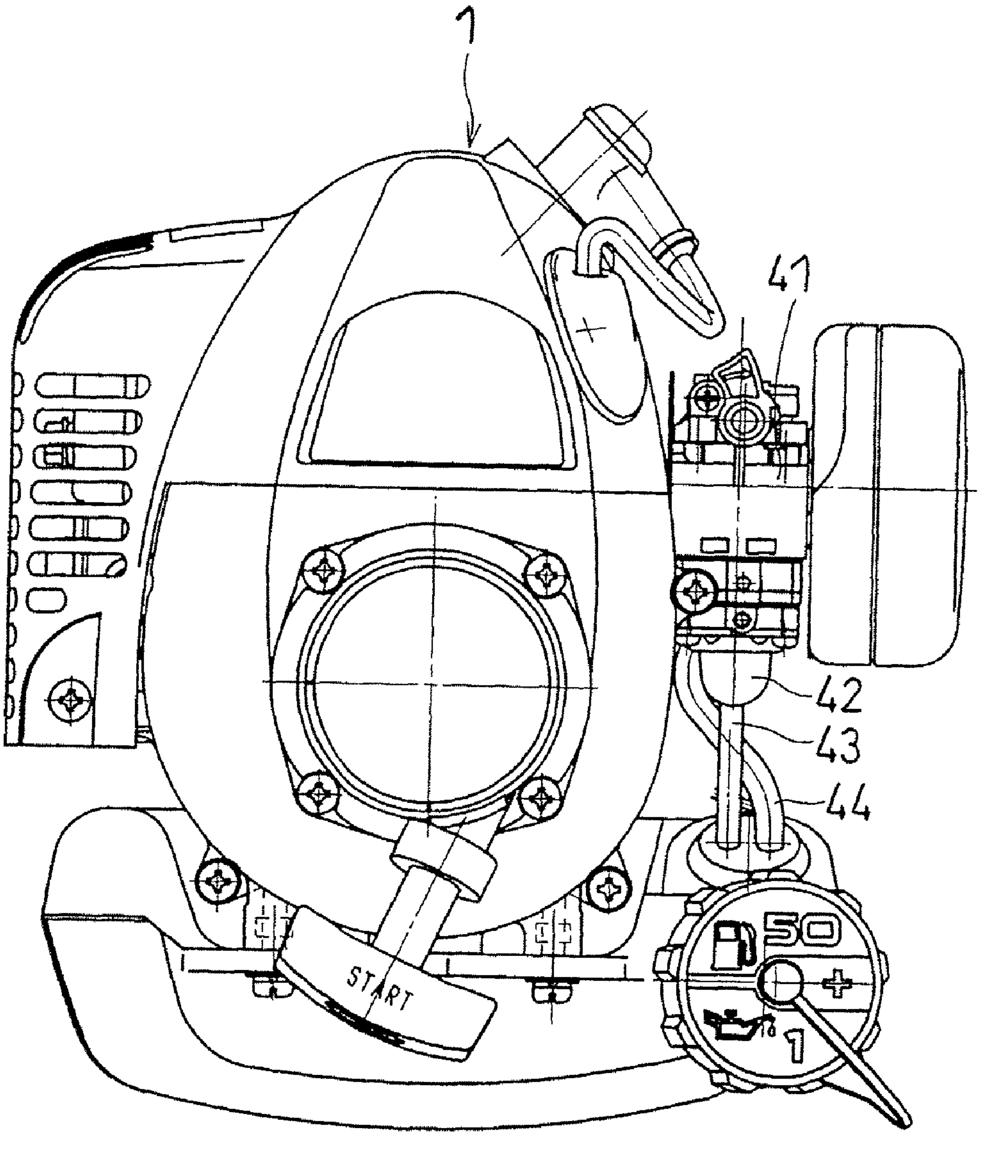
Fig. 4 Conventional Art
FIG. 4 is a front elevational view of the conventional combustion engine.
Figure 5:
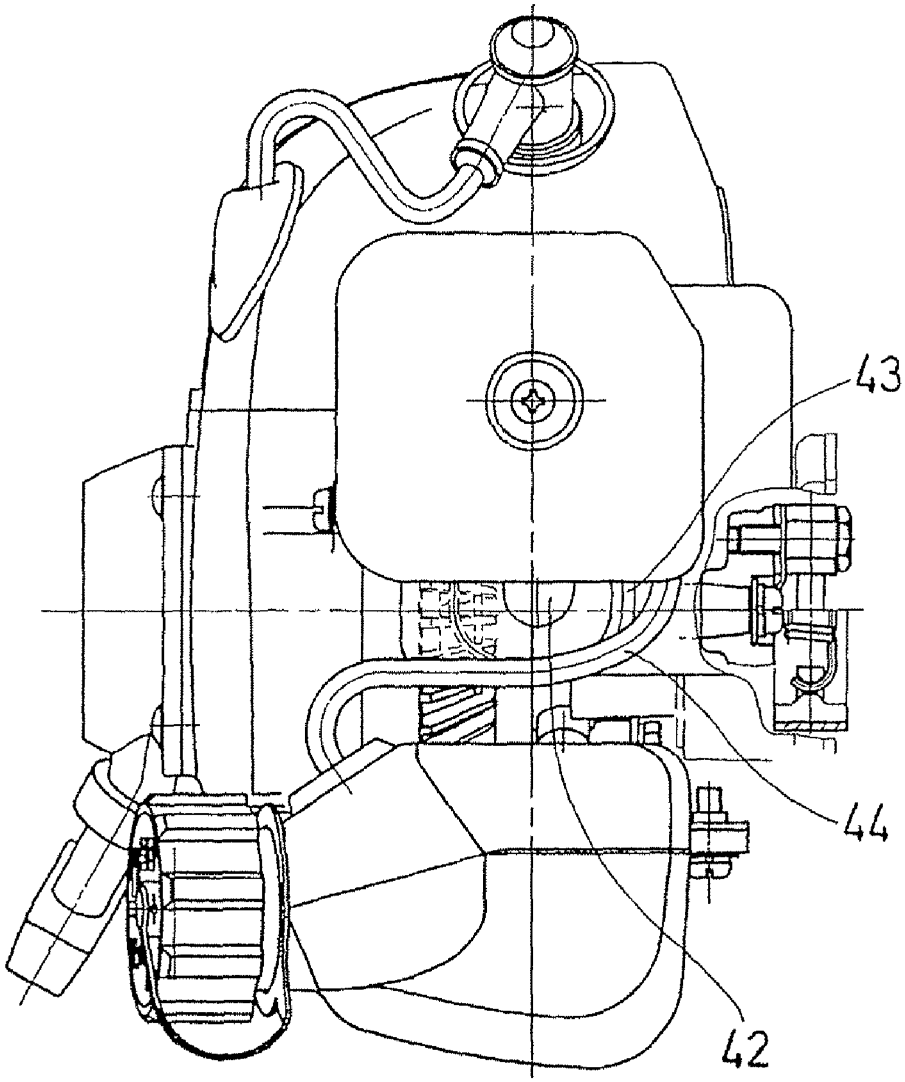
Fig. 5 Conventional Art
FIG. 5 is a side view of the conventional combustion engine.

FIG. 1 illustrated a front elevational view of a combustion engine according to a preferred embodiment of the present invention, FIG. 2 illustrates a side view of the combustion engine, and FIG. 3 illustrates a cross-sectional view taken along the line III-III in FIG. 1. Referring particularly to FIG. 3, the combustion engine E includes an engine body 1 made up of crankcase 2 and a cylinder block 4 mounted atop the crankcase 2. The cylinder block 4 includes a cylinder 4*a* having a cylinder bore and a cylinder head 4*b* formed integrally with the cylinder 4*a*. A piston 5 is reciprocatingly accommodated within the cylinder bore for movement up and down.

The crankcase 2 rotatably supports a crankshaft 6 by means of axially spaced apart bearings 7 and 9 with the crankshaft 6 extending in a direction longitudinally of the engine body 1. The crankshaft 6 has a front end portion (a left side in FIG. 3), which is a non-output side, and a rear end portion which is opposite to the front end portion and is an output side. A cooling fan 8 concurrently serving as a flywheel is mounted on the front end portion of the crankshaft 6 for rotation together therewith, and a centrifugal clutch 10 is mounted on the rear end portion of the crankshaft 6 and is in turn drivingly connected with a work machine.

As shown in FIG. 1, the combustion engine E also includes a carburetor 24, which forms a fuel supply device, for introducing fuel into an intake air of the engine. It is, however, to be noted that for the fuel supply device, any known fuel injection device may be employed in place of the carburetor 24. This carburetor 24 is connected to a lateral side portion (for example, a right side portion, as viewed in FIG. 1) of the cylinder block 4 of the engine body 1 through an insulator 22, and an air cleaner 26 for substantially purifying the intake air ready to be introduced into the carburetor 24 is fluidly connected with and positioned upstream of the carburetor 24 with respect to the direction of flow of the intake air towards the carburetor 24. Although not shown, as a matter of design, the air cleaner 26 includes a cleaner casing 26*a* made of, for example, a synthetic resin and accommodating therein a cleaner element for filtering the incoming air.

An exhaust muffler 16 is fluidly connected with an opposite lateral side portion (i.e., a left side portion, as viewed in FIG. 1) of the cylinder block 4 of the engine body 1, and the cylinder block 4 and the exhaust muffler 16 are both enclosed by a shroud 18 made of, for example, a synthetic resin. A plug cap 20 enclosing an ignition plug (not shown) is positioned above the shroud 18 so as to protrude upwardly therefrom.

The combustion engine E furthermore includes a fuel tank 28 secured from below to the crankcase 2 and fluidly connected with the carburetor 24 through a fuel supply tube 30.

The cooling fan 8 best shown in FIG. 3 has its front, bottom and opposite lateral portions thereof covered by a fan housing 34 secured to the crankcase 2 by means of set screws 37 (FIG. 1). This fan housing 34 may be made of either aluminum by means of a casting technique or an engineering resin by means of a molding technique. The fan housing 34 is so designed and so positioned that a stream of cooling air C induced by the cooling fan 8 during the rotation of the latter can flow along an inner surface of the fan housing 34 so as to be introduced into the cylinder block 4 and the exhaust muffler 16 (FIG. 1) by means of the shroud 18 that is connected with the fan housing 34. The shroud 18 referred to above is of a design covering respective areas above the cooling fan 8 and the cylinder block 4, while encircling around an entire periphery of the cylinder block 4.

A recoil starter 14 is arranged at a location axially outwardly of the cooling fan 8 and is supported by the fan housing 34. This recoil starter 14 is utilized to rotate the crankshaft 6 through a starter pulley 12 mounted on the cooling fan 8 for rotation together therewith, to thereby start the combustion engine E in any manner well known to those skilled in the art. As a matter of design, the recoil starter 14 includes a hand-operated starter grip 40, as best shown in FIG. 1.

Referring to FIGS. 1 and 2, the fan housing 34 is formed integrally with a flange 36 so as to protrude laterally outwardly from a lateral outer surface thereof to a position proximate to the carburetor 24. A priming pump 17 of a design including an operating portion in the form of a generally semispherical shell made of a rubber material is fitted to the flange 36, with the operating portion thereof oriented forwardly of the combustion engine E so as to be accessible from front of the combustion engine E. In the illustrated embodiment, the priming pump 17 is so designed as to be activated when a press is applied to the operating portion repeatedly from front.

As clearly shown in FIGS. 1 and 2, the flange 36 is positioned downwardly and forwardly of the carburetor 24 and laterally of the fan housing 34, and is formed with a mounting surface area where the priming pump 17 can be secured with the operating portion thereof oriented forwardly. The priming pump 17 is fluidly connected with the fuel tank 28 through a fuel suction tube 32 and in turn with the carburetor 24 through a fuel pumping tube 33. The fuel is pumped up through the fuel suction tube 32 by the priming pump 17 and, subsequently, is supplied to the carburetor 24 through the pumping tube 33. Although in the illustrated embodiment, the flange 36 has been shown and described as formed integrally with the fan housing 34, the flange 36 may be a member separate from the fan housing 34 and may then be fixed to the fan housing 34 by means of a plurality of fastening elements such as, for example, set bolts.

The flange 36 is also formed integrally with a cylindrical guard 38 open at one end thereof in a forward direction thereof, and the priming pump 17 is inserted inwardly and, hence, encased within the guard 38. The priming pump 17 has a tip portion set backwards only a distance D from an open end edge of the guard 38 in a direction axially inwardly thereof.

From the foregoing description of the preferred embodiment of the present invention, it has now become clear that since the priming pump 17, fitted to the flange 36 rigid with the fan housing 34 shown in FIG. 2, separates a substantial distance from a bottom region of the carburetor 24, the priming pump 17 can be manipulated easily without being interfered with, for example, the fuel supply tube 30, the fuel suction tube 32 and the fuel pumping tube 33. Also, since the priming pump 17 is fixed to the fan housing 34 that is made of aluminum and is large in size, not the cleaner casing 26*a* that is made of, for example, the synthetic resin, and small in size, the support strength is high enough to allow the load, imposed on the priming pump 17 as a result of the pressing operation applied to the priming pump, can be accommodated sufficiently.

Also, positioning of the flange 36 at a location downwardly and forwardly of the carburetor 24 and proximate to the carburetor 24 as well as the fuel tank 28 is particularly advantageous in that the any of the fuel supply tube 30, the fuel suction tube 32 and the fuel pumping tube 33 can have a reduced length. Also, since the flange 36 is formed integrally with the guard 38 and the priming pump 17 is accommodated within such guard 38, the priming pump 17 can be encased within the guard 38 to be protected from contact with surroundings of the combustion engine E. In particular, the priming pump 17 can be prevented from contacting the grip 40, when the grip 40 of the recoil starter 14 is abruptly returned to the initial position by the action of a return spring immediately after the start. Yet, the use of the guard 38 of the cylindrical configuration makes it possible to allow the guard 38 to have a compact external form as well as an appearance comfortable to look.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the foregoing embodiment, the guard 38 has been shown and described as having a cylindrical configuration, it may have any suitable shape different from the cylindrical configuration, provided that the priming pump 17 can be protected without the accessibility thereto being impaired.

Accordingly, such changes and modifications are, unless they depart from the scope of the present invention as delivered from the claims annexed hereto, to be construed as included therein.

What is claimed is:

1. A combustion engine which comprises:

a crankshaft;

an engine body rotatably supporting the crankshaft;

a fuel supply device for introducing fuel into an intake air of the engine, the fuel supply device secured to the engine body;

a cooling fan mounted on a front end portion of the crankshaft;

a fan housing for enclosing the cooling fan, the fan housing being a member separate from and secured to the engine body and having a flange formed therein so as to extend towards a position proximate to the fuel supply device;

a manually operable priming pump fitted to the flange; and a guard, fitted to the flange, for covering an outer periphery of the priming pump, wherein the guard enclosing the outer periphery of the priming pump is of a cylindrical configuration with the priming pump encompassed within it.

2. The combustion engine as claimed in claim 1, wherein the operating portion of the priming pump has a tip area positioned axially inwardly of the guard from an open end edge of the guard.

3. A combustion engine which comprises:

a crankshaft;

a fuel supply device for introducing fuel into an intake air of the engine;

a cooling fan mounted on a front end portion of the crankshaft;

a fan housing for enclosing the cooling fan, the fan housing having a flange formed therein so as to extend towards a position proximate to the fuel supply device;

a manually operable priming pump fitted to the flange; and a guard, fitted to the flange, for covering an outer periphery of the primary pump, wherein the fan housing, the flange and the guard are all formed integrally with each other in a unitary structure.

4. The combustion engine as claimed in claim 1, wherein the priming pump is arranged at a location downwardly and forwardly of the fuel supply device and laterally of the fan housing.

5. The combustion engine as claimed in claim 1, wherein the priming pump has an operating portion oriented forwards so that the operating portion can be manipulated from front.

6. The combustion engine as claimed in claim 3, wherein the fan housing, the flange and the guard are made of aluminum.

7. In a compact size a combustion engine in a compact size with a hand pulled recoil starter, the improvement comprising:

a crankshaft;

a fuel supply device for introducing fuel into an intake air of the engine;

a cooling fan mounted on a front end portion of the crankshaft;

a fan housing for enclosing the cooling fan, the fan housing having a flange formed therein so as to extend towards a position proximate to the fuel supply device;

a hand grip member connected to the recoil starter and positioned for pulling above the fan housing in a direction away from the fan housing;

a manually operable priming pump mounted on the flange at a position offset from the pull and return direction of the hand grip member; and a guard, on the flange and extending above the flange for covering an outer periphery of the priming pump, wherein the fan housing, the flange and the guard are all formed integrally with each other in a unitary structure.

8. The compact sized combustion engine of claim 7 wherein the fan housing, the flange and the guard are integrally formed as a unitary metal structure.

9. The compact size combustion engine of claim 8 wherein the flange and guard form a portion of a housing for the manually operable priming pump.

10. The compact size combustion engine of claim 9 wherein the guard is a hollow cylindrical member that extends above a manually operable contact position for an operator to activate the priming pump bulb.

* * * * *